Nov. 8, 1949 W. C. STARKEY 2,487,280
LOAD LIMITING CLUTCH
Filed Dec. 20, 1944 2 Sheets-Sheet 1
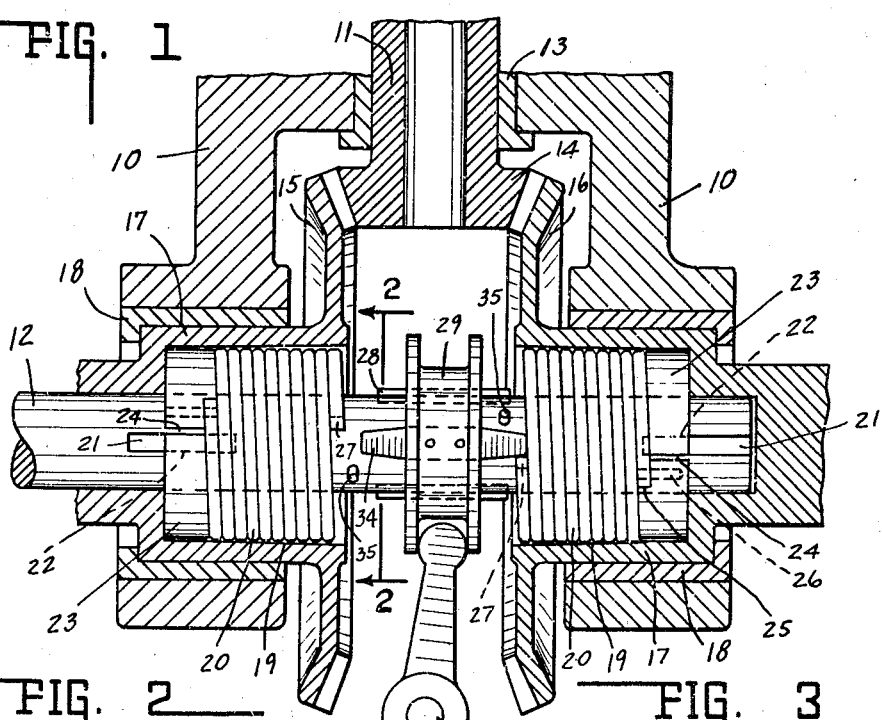
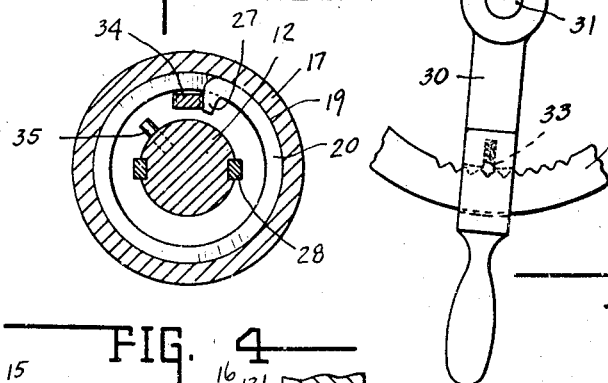
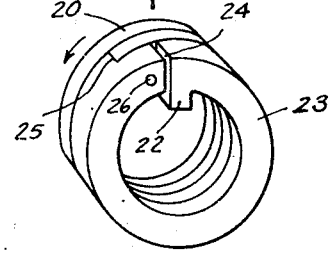
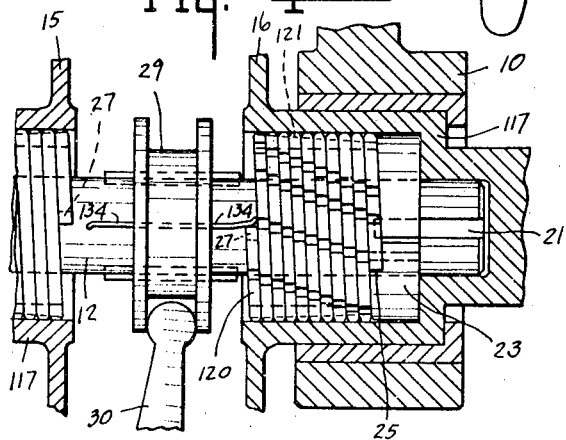
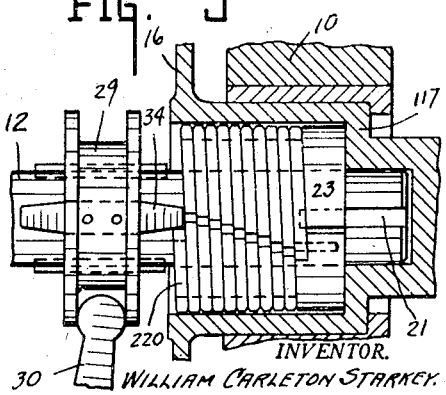
INVENTOR.
WILLIAM CARLETON STARKEY.
BY
Lockwood, Goldsmith & Galt,
ATTORNEYS.

Nov. 8, 1949   W. C. STARKEY   2,487,280
LOAD LIMITING CLUTCH
Filed Dec. 20, 1944   2 Sheets-Sheet 2
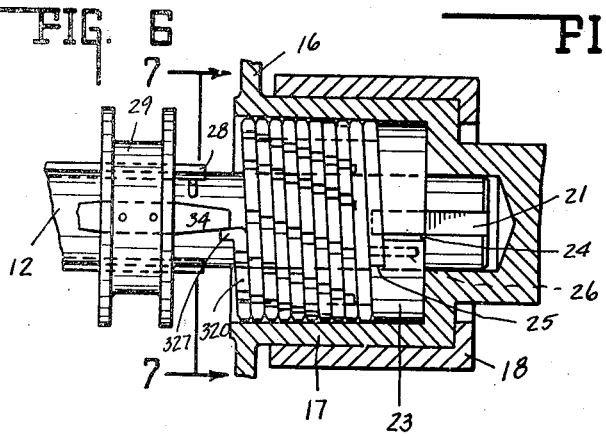
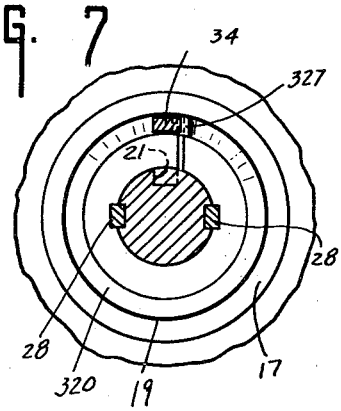
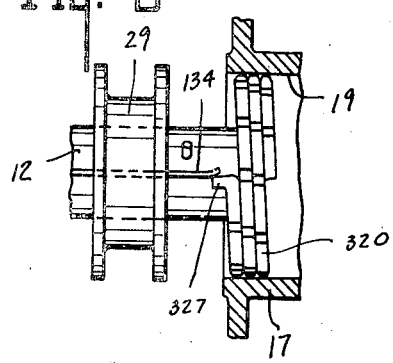
INVENTOR.
WILLIAM CARLETON STARKEY.
BY Lockwood, Goldsmith & Galt,
ATTORNEYS.

Patented Nov. 8, 1949

2,487,280

UNITED STATES PATENT OFFICE 2,487,280

LOAD LIMITING CLUTCH

William Carleton Starkey, Indianapolis, Ind., assignor to Fletcher Trust Company, Indianapolis, Ind., a corporation Application December 20, 1944, Serial No. 568,996

25 Claims. (Cl. 192—56)

This invention relates to a load limiting clutch wherein the torque load may be varied, and having many applications in respect to releasing a driving connection upon an overload being applied to a driven member, and particularly in association with a spring clutch acting as the torque limiting driving connection between the driving and driven members, reference being had to my pending application Serial No. 508,601, filed November 1, 1943, entitled "Torque limiting device" now Patent Number 2,459,972.

The invention is particularly useful and applicable in not only maintaining a predetermined driving force, such as may be controlled to a certain number of foot pounds, but to selectively vary such predetermined driving force through manual manipulation.

For example, the invention may be applied to the transmission of a machine such as a road grader, or any of the power transmitting elements thereof, to permit slippage of the clutch to render ineffective the source of power in event of an obstruction or overload, and wherein by manual shifting, the predetermined overload may be varied, depending upon the required work to be done and the capacity of the machine. For example, to eliminate unnecessary wear and tear upon the driving parts or elements of a road grader or bulldozer during normal service, the variable control may be set to a low degree of torque load, such as to effect slippage of the clutch in event such load is exceeded. However, there may be occasion to temporarily subject the machine to a much greater torque load to accomplish a given purpose, such as the removal of a boulder or stump, whereupon the operator may shift or set the clutch to function up to a higher predetermined load, after which it may be returned to normal. It is further desirable that there be a maximum load carried by the clutch beyond which breakage might occur and beyond which the operator cannot increase the load carrying capacity, whereby upon the load exceeding a predetermined maximum, the clutch will slip and avoid breakage.

The invention, therefore, contemplates the application of a load limiting clutch as set forth and disclosed in the above application, but wherein the clutch may be manually set to drive at varying degrees of torque load within predetermined limits. This may be accomplished, for example, by providing an energizing finger or cam-like element engageable with the energizing end of the clutch spring to positively displace it relative to the load carrying end and to a more or less degree of compression to vary its torque transmitting characteristic.

A further feature of the invention resides in the provision of a reversible load limiting drive, wherein a reversing element may be actuated to varying positions for controlling the torque load on the driven element when driven in either forward or reverse direction.

Still a further feature of this invention resides in the relation of the clutch spring or its respective coils to the clutching surface such that the clutching action will be initiated at the load carrying end of the spring and progress to the energizing end thereof. Similarly the declutching action will be caused to progress from the energizing end to the load carrying end. This provision eliminates sudden grabbing of the clutch such as to cause a chattering effect during the overload clutching and declutching action.

From the foregoing it will be observed that the invention has many applications, particularly wherein it is desirable to manually vary the overload capacity and to shift from forward to reverse, and, therefore, among other things is applicable not only to road graders and elements thereof, such as the scraping blade, but to bulldozers, trucks, hand and automatic tools, such as screw drivers, wrenches and the like. Thus, in the former type of heavy duty machines, one overload capacity setting may be desirable for normal operation with a higher setting for special work, i. e., a short operation such as pulling a truck out of mud or up a bank. On the other hand, such light applications as in the latter type, it may be desirable to apply the tool to a set of screws or studs under one load application and re-set it for application to another set of screws or studs at a different load application.

The full nature of the invention will be understood from the accompanying drawings and the following description and claims.

Fig. 1 is a central vertical section through the driving mechanism with the clutch elements and driven shaft in elevation. Fig. 2 is a section taken on the line 2—2 of Fig. 1. Fig. 3 is a perspective view of the overload spring with a portion of the clutch spring connected therewith. Fig. 4 is the same as Fig. 1 with parts broken away and removed showing a modified form of clutch spring energizer and spring and pocket construction. Fig. 5 is the same as Fig. 1 with parts broken away and removed, showing a modified form of spring and pocket construction. Fig. 6 is the same as Fig. 1 with parts broken away and removed, showing a modification of the camming engagement between the energizing element and clutch spring. Fig. 7 is a section taken on the line 7—7 of Fig. 6. Fig. 8 is the same as Fig. 4 with parts broken away and removed, showing a modification of the engagement between the energizing element and clutch spring.

In the form and operation of the clutch as in Figs. 1, 2 and 3, there is shown for purpose of illustration a transmission housing 10 mounting a driving member or shaft 11 and a driven member or shaft 12. It should be understood, however, that the driving force may be applied to the shaft 12 for driving the shaft 11 as the driven member. The shaft 11 extends into the housing, being rotatably supported by the bearing 13, and terminating in a beveled pinion 14 adapted to mesh with and drive the beveled gears 15 and 16 in opposite directions. Thus, the gears 15, 16 and pinion 14 constitute a reverse drive.

The gears 15 and 16 are provided with hubs 17 rotatable in the bearings 18 carried in the housing, each of said hubs being formed with a clutch engaging drum here shown as a pocket provided with an internal clutch surface indicated at 19. As illustrated in Fig. 1, said clutch surfaces of the pockets are each tapered outwardly toward the open portion thereof, and are designed to each receive a clutch spring 20 which is generally cylindrical and so formed as to normally be supported out of clutching engagement with the internal clutch surface. Due to the taper of said surfaces, the inner or energizing ends of the springs adjacent the open face of the pockets will be normally spaced a greater distance from the clutching surface than the opposite or load carrying ends.

The shaft 12 extends through one of the pockets 17, with its thrust end extending into a recess in the opposite pocket to provide a supporting end bearing therefor, said shaft being normally rotatable within said pockets. The shaft 12 is provided with keyways 21 for receiving the down turned toe 22 on each of its overload release spring bands 23 to form a driving key between the shaft and the respective bands. Said bands are split at 24 and are normally of smaller diameter than the inner diameter of the pockets in which they are mounted to be adjacent the closed or reduced ends thereof. Thus, said bands are arranged to expand under a predetermined overload, and upon such expansion permit slippage of their respective clutch springs in the manner hereinafter described.

Each of said bands has its inner face formed with a convolute surface to accommodate the end coil of the clutch spring 20, the free end of said spring abutting the shoulder 25 against which it is secured by a dowel pin 26. The opposite end of the spring 20 is formed with a downwardly turned toe 27. The end of the spring abutting and secured to the overload release spring 23 is herein termed "the load carrying end," whereas the opposite end of said spring provided with a toe 27 is termed "the energizing end" thereof.

Slidably keyed upon the shaft 12 by the keys 28 and rotatable with said shaft there is a flanged shift collar 29. Said collar may be shifted along the shaft by a variable overload control or shift lever 30 engaging between the flanges of the collar and pivoted to any suitable support at 31. The shift lever may be shiftable along a latching bar 32 and held in shifted position by a spring pressed ball 33 operating in detents provided in said bar. Thus, the collar 29 may be manually shifted toward and away from the opposed springs 20 and may be set at any desired postion with respect thereto.

The shift collar 29 carries an opposed pair of spring energizing elements 34, each of which, as shown in Figs. 1, 2, 5, 6 and 7, may be in the form of a finger having a cam surface. These elements and the clutch springs 20 are so positioned relative to each other that upon the collar 29 being moved to a central position, said elements will not operably engage the springs. Upon the collar being shifted slightly to one side, the cam surface of one of the elements will engage the toe 27 of its adjacent spring and by reason of its cam formation will urge said clutch spring into its expanded clutching engagement within its pocket. Thus, as shown in Fig. 1, the right hand clutch spring has been engaged and expanded by the energizing element into clutching engagement with its pocket, whereas the left hand spring remains out of clutching engagement with its pocket to permit of free relative rotation therebetween.

At or about the point of overload release, it is desirable that the spring gradually clutch and declutch to avoid sudden action such as to produce chattering. For this purpose, there is provided a tapering relation between the outer clutching surface of the spring and the inner clutching surface of the pocket. The pocket of Fig. 1 is tapered so that the load carrying end of the spring lies closer to the friction surface than the energizing end of the spring. Therefore, upon the energizing element engaging the toe 27 and thereby expanding the spring, the load carrying portion of the spring will first expand into clutching engagement with the pocket. As the load is increased, said spring will gradually clutch the pocket progressively from the load carrying end toward the energizing end. This permits of a more gradual clutching and declutching action than would result if all of the coils of the spring were expanded simultaneously into clutching engagement throughout its entire length. Through this arrangement of the progressive clutching action from the load carrying to the energizing end of the spring, chattering of the spring is avoided, i. e., intermittent grabbing and releasing. Also the clutching action thereof is more sensitive to the overload torque. This tapering relation between the spring and the pocket with the progressive clutching and declutching of the spring from one end to the other also is important in facilitating action of the spring in permitting the maximum driving or overload torque to be varied in the following manner.

It may be here pointed out, for example, that when the shaft 11 is the driving member and the shaft 12 the driven member, the hubs 17, and, therefore, the pockets, are normally driven in reverse directions in over running relation to the springs. Upon the energizing element 34 being moved into engagement with the toe 27 of one of the springs to expand it, such expansion first causes the opposed load carrying end of the engaged spring to clutch the pocket adjacent the band 23. The clutch spring will thereupon rotate in the direction of the arrows with the pocket, its load carrying end being in abutment with the shoulder 25 of the spring band 23 to thereby rotate said band. The band in turn, being keyed to the shaft 12, will correspondingly rotate said shaft. However, upon said shaft being overloaded beyond a predetermined foot pound, the resistance to further turning of the shaft is transmitted to the band through the key 22, causing the band to be expanded by the driving force of the spring. Upon the band being thus expanded, it permits of relative rotation between the load end portions of the spring at 25 and the still expanded and therefore clutch-active coils of the spring so as to render the clutch spring partially inactive by contracting the load carrying end portions of the spring away from the pocket while leaving energizing end portions of the coils sufficiently engaged with the pocket to carry the normal torque. Upon the overload being lessened, the band 23 will return to its normal position, pulling the load end of the spring at 25 in the reverse or expanding direction back to full clutching engagement with the pocket.

The spring band may be so formed and constructed as to expand to release the clutch at a predetermined foot pound, for example, twenty foot pounds. Thus with the normal engagement of the spring by the energizing element, as shown in Fig. 1, the shaft will be driven under a torque load up to twenty foot pounds. Upon the load being in excess thereof, the band will give or expand to effect declutching through the slippage of the clutch spring. However, the overload may be increased by varying the position of the energizing end of the clutch spring at the toe 27. Since the declutching or slippage of the spring is dependent upon the relation of the opposed ends thereof at 25 and 27, by changing that relation the load at which the spring will declutch or slip through the action of the band 23 may be increased. The energizing element 34 is, therefore, designed with a camming surface so that as it is moved inwardly toward the spring, its camming surface in engagement with the toe 27 will displace it toward the load end of the spring at 25. The clutch spring is, therefore, not only under greater compression, but a correspondingly greater movement of the load carrying end will be required to release it. Such further movement of the load carrying end is occasioned only by a greater expansion of the band 23 under a heavier torque load.

In view of the above, by means of the lever 30, the energizing element may be moved to different positions relative to the toe of the spring, and by reason of its camming surface will vary the relation thereof in respect to the load end of the spring at 25, such as to increase the load necessary to cause sufficient expansion of the band 23 and corresponding movement of the load carrying end of the spring, such as to permit its contraction out of full clutching engagement. Such camming action, however, is limited in extent by the limit pins 35 secured on the shaft 12 and so positioned as to be engaged by the sliding collar 29. Said pins may thus be suitably positioned relative to the collar 29 and the camming surface of the energizing elements 34 to limit the extent to which the load may be increased, and thereby provide for a maximum load capacity.

In the modified form of Fig. 4, the hubs of the gears 15 and 16 are provided with a straight cylindrical pocket 117, as distinguished from the tapered pocket 17 of Fig. 1. To permit of the progressive clutching action of the clutch spring in the straight cylindrical pocket, said spring is provided with a series of grooves indicated by the dotted lines at 121, and wherein the depth at which said grooves are cut progressively increases from the energizing end at the toe 27 to the load carrying end indicated at 25. In this construction of clutch spring there will be less resistance to expansion into clutching engagement where the grooves 121 are of greater depth. This permits of the expanding action of the spring being transmitted first to the load carrying end where the grooves 121 are of the greatest depth, since such portion of the spring will be the more flexible.

Also, as shown in the modified form of Fig. 4, the energizing element is in the form of a spring finger 134, the spring resilience of the finger having the same effect upon the energizing toe 27 of the spring as the camming surface of the energizing element 34. Thus, as the collar 29 is moved toward the clutch spring, the spring finger 134 will, under its inherent spring tension, exert a greater expanding force on the clutch spring to thereby increase the point of overload release accordingly.

In the modified form of Fig. 5, the straight cylindrical clutch pocket 117, as in Fig. 4, encompasses a tapered clutch spring 220, the clutch spring being of greater thickness at its energizing end than at its load carrying end. Thus, the coils of the spring at the load carrying end are slightly weaker and, therefore, more susceptible of expansion into clutching engagement than at the energizing end. By means of such tapered spring, upon the spring being energized for expansion into clutching engagement with the pocket, such action will be transmitted throughout the series of coils, causing the weaker coil at the load carrying end to first expand into clutching engagement followed progressively from that end toward the energizing end of the spring in accordance with their respective cross sectional areas.

In the modified form of Figs. 6 and 7, the clutch spring 320 is formed with the energizing toe 327 extending laterally toward the energizing element 34 for engagement thereby. Thus, instead of the toe extending radially inwardly, as in Figs. 1 and 2, with the energizing element engaging therewith and movable within the coils of the spring, by means of the arrangement shown in Figs. 6 and 7, the energizing element may move in the plane tangential to the spring and produce its variable overload release action through its sliding engagement with the elongated laterally directed toe 327.

A similar arrangement is shown in the modified form of Fig. 8 wherein the laterally-extending elongated toe 327 of the clutch spring 320 is engaged by the energizing element in the form of a spring finger 134.

Whereas the invention has been above described in respect to one adaptation thereof with various modifications, the variable load limiting clutch is similarly applicable to various driving mechanisms, as well as tools and devices for applying a limited torque load, and wherein it is desirable to vary the minimum torque load at which the device will release up to a maximum overload.

Also, as illustrated herein, the clutch is applicable to a reverse driving mechanism and wherein the variable control of the overload release also acts as the reverse drive control mechanism. By means of this arrangement upon the control lever 30 being moved in one direction to varying degrees, the load will be variably limited in a given direction to the extent of the variable movement in that direction of the lever. When the lever is moved in the opposite direction the power will be applied in the opposite direction to an extent in accordance with the movement in that direction of the lever. When the lever is in intermediate or neutral position, the driving power will be disconnected and there will be no driving action.

Wherein reference has been made herein to the declutching or releasing of the clutch spring with respect to the clutch surface, it is to be understood that such action involves slippage between the clutch spring and the clutch surface to a degree less than full driving relation therebetween, and whereby such slippage prevents transmission of the overload while at the same time maintaining the desired driving torque.

The invention claimed is:

1. A variable load limiting clutch including a driving member, a driven member, one of said members being provided with a clutch engaging surface, a clutch spring having a series of expansible and contractible coils mounted for movement into and out of effective driving engagement with said clutch engaging surface, load sensitive means interconnecting said clutch spring and the other of said members and effective upon an overload being applied to one of said members tending to relieve at least part of said clutch spring from clutching engagement with said clutch engaging surface thereby to render partially ineffective the driving connection between said members, and a shiftable element engageable with one end of said clutch spring for affecting its relation to said load sensitive means in a manner to vary the overload required to render said driving connection partially ineffective.

2. A variable load limiting clutch including a driving member, a driven member, one of said members being provided with a clutch engaging surface, a clutch spring having a series of expansible and contractible coils mounted for movement into and out of clutching engagement with said clutch engaging surface to provide a driving connection between said members, a load sensitive spring operable under a predetermined torque force exerted thereon by an overload applied to one of said members to permit relative movement between one of said members and said load sensitive spring, said relative movement being effective to permit said clutch engaging spring to move in a direction out of effective clutch engagement with said clutch engaging surface and a control element operable so to move said clutch spring as to vary the overload required.

3. A variable load limiting clutch including a driving member, a driven member, one of said members being provided with a clutch engaging surface, a clutch spring having a series of expansible and contractible coils movable into and out of effective clutching engagement with said surface, a load sensitive spring interconnecting said clutch spring and the other of said members effective upon an overload being applied thereto to permit said clutch spring to move in a direction out of clutching engagement with said surface, and an energizing element engageable with one end of said clutch spring, said element being shiftable to move said clutch spring variably to different operative positions whereby to vary the overload required to permit said clutch spring to move in a direction away from said clutch engaging surface.

4. A variable load limiting clutch including a driving member, a driven member, one of said members being provided with a clutch engaging surface, a clutch spring having a series of expansible and contractible coils movable into and out of engagement with the clutch engaging surface of said last-mentioned member, a load sensitive spring interconnecting said clutch spring and the other of said members and effective upon an overload being applied thereto to permit said clutch spring to move in a direction out of clutching engagement with said clutch engaging surface, and an energizing element engageable with one end of said clutch spring and shiftable to displace said end relative to the opposite end thereof to increase the clutching force of the spring and thereby increase the torque load required to permit said opposite end of said clutch spring to move out of effective clutching engagement with said clutch engaging surface.

5. A variable load limiting clutch including a driving member, a driven member, one of said members being provided with a clutch engaging surface, a clutch spring having a series of expansible and contractible coils movable into and out of clutching engagement with said surface, a load sensitive spring having one end operatively connected with the load carrying end of said clutch spring and the other end thereof connected with the other of said members and effective upon an overload being applied to one of said members to effect the displacement of the load carrying end of said clutch spring away from the clutch engaging surface thereby to render the clutch engaging surface at least partially ineffective as a driving connection between said members, and an energizing element engageable with the energizing end of said clutch spring and shiftable to displace said energizing end relative to said load carrying end to increase the clutching force thereof and thereby increase the overload required to render said clutching engagement partially ineffective.

6. A load limiting clutch, including a driving member, a driven member, one of said members being provided with a drum having a clutch engaging surface, a clutch spring having a series of expansible and contractible coils movable into and out of clutching engagement with said drum, said clutch spring being normally out of engagement therewith and having a load carrying end and an energizing end, said clutch spring being movable into clutching engagement with said drum upon said energizing end being displaced in one direction relative to said load carrying end, and a load sensitive spring interconnecting the load carrying end of said spring and the other of said members to effect a driving connection between said members upon said clutch spring being expanded into clutching engagement with said clutch engaging surface, said load sensitive spring in response to an overload applied to one of said members being adapted to effect relative movement between the load carrying end and the energizing end of said clutch spring, whereby said spring will tend to move out of effective clutching engagement with said clutch engaging surface.

7. A load limiting clutch including a driving member, a driven member, one of said members being provided with a drum having a clutch engaging surface, a clutch spring having a series of expansible and contractible coils movable into and out of clutching engagement with said drum and normally out of clutching engagement therewith, said clutch spring having an energizing end and a load carrying end, a load sensitive spring interconnecting the load carrying end of said clutch spring with the other of said members, and an energizing element engageable with the energizing end of said clutch spring to move it into clutching engagement with said drum for drivingly connecting said members through said load sensitive spring, said load sensitive spring being adapted, when subjected to an overload torque force, to urge said clutch spring in a direction out of clutching engagement with said clutch engaging surface.

8. A load limiting clutch, including a driving member, a driven member, one of said members being provided with a drum having a clutch engaging surface, a clutch spring having a series of expansible and contractible coils movable into and out of effective driving clutching engagement with the drum of said last-mentioned member, said clutch spring being normally out of clutching engagement therewith and having a load carrying end and an energizing end, said clutch spring being expansible into clutching engagement with said drum upon said energizing end being displaced relative to said load carrying end, an energizing element on the other of said members operating to displace said energizing end and a load sensitive spring interconnecting the load carrying end of said clutch spring and the other of said members to effect a driving connection between said members upon said clutch spring being expanded into clutching engagement, said load sensitive spring being affected by an overload applied to one of said members to permit of relative movement between the load carrying end and the energizing end of said clutch spring whereby said clutch spring will tend to move out of clutching engagement, said energizing element being shiftable to displace the energizing end of the clutch spring relative to the load carrying end thereof to thereby increase the overload required to permit slippage of the clutch spring.

9. A variable load limiting clutch including a driving member having a spring clutch receiving drum, a driven member freely rotatable relative to said driving member, said drum having a clutch engaging surface, a clutch spring having a series of expansible and contractible coils normally out of clutching engagement with said drum and expandible into clutching engagement therewith, said clutch spring having an energizing end and a load carrying end, a load sensitive spring mounted about said drum and having one end secured to said driven member and the other end operably connected with the load carrying end of said clutch spring, and a shiftable energizing element operably engageable with the energizing end of said clutch spring to move it into clutching engagement with said drum for transmitting power therefrom to the driven member through said load sensitive spring, said load sensitive spring being expandible upon an overload being applied to said driven member for permitting relative movement between the load carrying end of said clutch spring and the energizing end thereof to permit movement of said clutch spring in a direction out of clutching engagement with said drum.

10. A load limiting clutch, including a driving member having a spring clutch engaging drum, a driven member freely rotatable relative to said driving member, said drum having a clutch engaging surface, a clutch spring having a series of expandible and contractible coils normally out of clutching engagement with said drum and expandible into clutching engagement with said clutch engaging surface, said clutch spring having an energizing end and a load carrying end, and a split spring band mounted concentric with said drum having one end secured to said driven member and the other end thereof operably connected with the load carrying end of said clutch spring through which said clutch spring when in clutching engagement with said drum is adapted to directly drive said driven member, said band being expandible upon a predetermined overload being applied to said driven member to effect displacement of the load carrying end of said clutch spring relative to the energizing end thereof to thereby tend to move the spring out of clutching engagement with the clutch engaging surface of said drum.

11. A variable load limiting clutch, including a driving member having a spring clutch engaging drum, a driven member freely rotatable relative to said driving member, said drum having a clutch engaging surface, a clutch spring having a series of expandible and contractible coils normally out of clutching engagement therewith, said clutch spring having an energizing end and a load carrying end, a split spring band having one end secured to said driven member and the other end thereof operably connected with the load carrying end of said clutch spring through which said clutch spring when in clutching engagement with said drum is adapted to directly drive said driven member, said band being expandible upon a predetermined overload being applied to said driven member to effect displacement of the load carrying end of said clutch spring relative to the energizing end thereof in a direction tending to move said clutch spring out of clutching engagement with said pocket, and an energizing element shiftable to varying positions relative to the energizing end of said clutch spring to vary its relative position in respect to the load carrying end thereof to thereby increase the displacement of the load carrying end and said split band required partially to declutch said clutch spring through the application of a load greater than said predetermined overload.

12. A variable load limiting clutch, including a driving member having a spring clutch engaging drum, a driven member freely rotatable relative to said driving member, said drum having an internal clutch engaging surface, a clutch spring having a series of expandible and contractible coils normally out of clutching engagement with said drum and expandible into clutching engagement therewith, said clutch spring having an energizing end and a load carrying end, a split spring band having one end secured to said driven member and the other end thereof operably connected with the load carrying end of said clutch spring through which said clutch spring when in clutching engagement with said drum is adapted to directly drive said driven member, said band being expandible upon a predetermined overload being applied to said driven member to effect displacement of the load carrying end of said clutch spring relative to the energizing end thereof in a direction tending to move said clutch spring out of clutching engagement with said drum, an energizing element shiftable to varying positions relative to the energizing end of said clutch spring to vary its relative position in respect to the load carrying end thereof to thereby increase the displacement of the load carrying end and said split band required to partially declutch said clutch spring through the application of a load greater than said predetermined overload, and means for limiting the movement of said element and displacement of the energizing end of said clutch spring thereby to limit the increase in overload at which said clutch spring will move toward declutching position.

13. A spring clutch device including a driving member, a driven member, one of said members being provided with a surface having a clutch engaging surface, a clutch spring having a series of expandible and contractible coils movable into and out of clutching engagement therewith, means for connecting the load carrying end of said clutch spring with the member other than that provided with said surface, said clutch spring being normally out of clutching engagement with said drum and axially movable means engageable with the energizing end of said clutch spring to effect the expansion thereof into clutching engagement with said surface, said clutch spring and pocket being so tapered relative to each other that in their normal position out of clutching engagement each coil will be spaced a greater distance from said surface progressively from the load carrying end to the energizing end of the clutch spring, whereby upon said clutch spring being energized the expansion thereof will tend to effect clutching engagement with said surface progressively from the load carrying end to the energizing end of said clutch spring.

14. A spring clutch device including a driving member, a driven member, one of said members being provided with a drum having a clutch engaging surface, a clutch spring having a series of expandible and contractible coils movable into and out of clutching engagement therewith and normally out of clutching engagement, means for connecting the load carrying end of said spring with the member other than that provided with said drum, and means for operatively engaging said spring to effect movement thereof into clutch engagement with said drum, the coils of said spring being progressively weakened from the energizing end toward the load carrying end, whereby upon being energized to expanded position at the energizing end the weaker coils at the load carrying end will be caused to first expand into clutching engagement with said drum and be the first to be released from said clutching engagement upon said spring moving to declutching position.

15. A load limiting clutch including a driving member, a driven member, one of said members being provided with a clutch engaging surface, a clutch spring having a series of expandible and contractible coils movable into and out of clutching engagement with said clutch surface, means associated with one of said members for operably engaging the energizing end of said clutch spring to urge its expansion into clutching engagement with said clutch engaging surface, and a load sensitive spring connecting the opposite load carrying end of said clutch spring to the other of said members, whereby upon a predetermined overload being applied to said load sensitive spring it will permit relative movement between the ends of said clutch spring tending to relieve said coils from their clutching engagement with said clutch engaging surface, said clutch spring being so related to said clutch engaging surface that the coils of the former will tend to move into or out of clutching engagement with the latter progressively from the end of the clutch spring connected with said load sensitive spring to the other end of said clutch spring.

16. A variable load limiting clutch including a driving member, a driven member, a clutch mounted for engagement with one of said members, load sensitive means interconnecting said clutch and the other of said members and effective upon a predeterminable overload being applied to one of said members to effect at least partial slippage of said clutch relative to said first-mentioned member, and a control element operatively engageable with said clutch to change its relation with respect to the load sensitive means to thereby vary said overload point necessary to permit slippage of said clutch.

17. A variable load limiting clutch including a driving member, a driven member, a clutch element mounted for clutching engagement with one of said members to provide a driving connection with the other of said members, a load sensitive element operable on the clutch element under a torque force exerted thereon by an overload applied to one of said members to permit slippage of said clutch element upon relative movement between said members and a control member operable on one of said members to vary the overload value necessary to enable such relative movement.

18. A variable load limiting clutch including a driving member, a driven member, a spring coil type clutch for connecting said members, a load sensitive element interconnecting said spring clutch and one of said members and effective upon an overload being applied thereto partially to declutch said members, and an energizing element engageable with said clutch and operable to move said spring clutch to varying positions affecting its relation to said load sensitive element to thereby vary the partial declutching overload.

19. A spring clutch device including a driving member, a driven member, one of said members being provided with a clutch engaging surface, a clutch spring having a series of expansible and contractible coils movable into and out of clutching engagement with said clutch engaging surface and normally out of clutching engagement therewith, said spring having an energizing end and a load carrying end, means for connecting the load carrying end of said spring with one of said members, means associated with the other of said members for operably engaging the energizing end of said spring to effect relative movement between the energizing and load carrying ends thereof to move it into clutching engagement with said clutch engaging surface, said spring and clutch engaging surface being so related as between the energizing and load carrying ends of said spring to transmit its energizing action first to the coils thereof at the load carrying end to effect clutching engagement thereby, said clutching engagement of the load carrying coils acting progressively to move the coils into clutching engagement with said surface from said load carrying end to the energizing end of the spring.

20. A spring clutch device including a driving member, a driven member, one of said members being provided with a clutch engaging surface, a clutch spring formed with progressively weaker coils from its energizing to its load carrying end, said coils being normally out of clutching engagement with said clutch engaging surface and movable into clutching engagement therewith, means for connecting the weaker coils of the load carrying end of said spring with the member other than that provided with the clutch engaging surface, and means for operably engaging the energizing end of said spring to move said coils into clutching engagement with said surface whereby said energizing action will be transmitted from the energizing end of said spring to first move the weaker coils at the load carrying end thereof into clutching engagement and said load carrying coils will cause the coils of said spring to be progressively moved into clutching engagement with said surface toward the energizing end of said spring.

21. A spring clutch device including a driving member, a driven member, one of said members being provided with a clutch engaging surface, a clutch spring having a series of expansible and contractible coils mounted for engagement with said clutch surface and movable into and out of clutching engagement therewith, means for connecting the load carrying end of said spring with the member other than that provided with a clutch engaging surface, said spring being normally out of clutching engagement with said surface, and means for operably engaging the energizing end of said spring to effect expansion thereof into clutching engagement with said surface, said spring and clutch engaging surface being so tapered relative to each other that in their normal relative positions out of clutching engagement each coil will be spaced a greater distance from said surface progressively from the load carrying end to the energizing end of said spring, whereby upon said spring being energized the load carrying end thereof will first clutch said clutch surface followed progressively by clutching of the coils therewith from the load carrying end to the energizing end of said spring.

22. A spring clutch device including a driving member, a driven member, one of said members being provided with a drum having a clutch engaging surface, a clutch spring mounted for clutching engagement with said pocket normally out of clutching engagement therewith, means for connecting the load carrying end of said spring with the member other than that provided with said drum, and axially movable means engageable with the energizing end of said spring to urge the spring into clutching engagement with said drum, different portions of said clutch spring and associated portions of said drum being so related in respect to tendency toward clutching engagement that the expansion of said clutch spring from the energizing end thereof will effect clutching engagement first at the load carrying end of said clutch spring and progressively therefrom toward the energizing end thereof.

23. A variable load limiting clutch including a driving member, a driven member, one of said members having a clutch surface, a helical clutch spring mounted for clutching engagement with said clutch surface, a load sensitive spring element interposed between one end of said clutch spring and the other of said members to transmit torque therebetween and effective upon overload to permit slippage of said clutch spring, and a control element carried by and rotatable with the said other member operably engageable with the opposite end of said clutch spring adjustable to different positions relative thereto for varying the angular relation of the ends of said clutch spring to thereby vary the overload torque under which said load sensitive spring will permit slippage of said clutch spring.

24. A load limiting clutch including a driving member, a driven member, one of said members being provided with a clutch engaging surface, a helical clutch spring having a load carrying end and an energizing end, the coils thereof being expansible and contractible into and out of clutching engagement with said clutch surface, an axially displaceable clutch actuating element mounted on and rotatable with the other said member movable into and out of operative engagement with the energizing end of said clutch spring to permit said spring to declutch said surface upon said element being axially moved from engagement therewith and urge said spring into said clutching engagement upon being moved to energizing engagement therewith, and a load sensitive spring interposed between the load carrying end of said clutch spring and the said other member to transmit torque therebetween and yield under overload to permit relative movement between the energizing and load carrying ends of said clutch spring in a direction tending to relieve said coils from their clutching engagement with said clutch engaging surface.

25. A torque transmitting device comprising a friction drum, a coaxial torque element, a helically coiled elastic friction band between the drum and element and normally out of contact with the drum, a torque transmitting connection between one end of the band and said element, a progressively acting energizing clutching-pressure-control connection between the opposite end of the band and said element operable at any time, either before or during relative rotation of the drum and element, to strain the coils of the band progressively into friction contact with the drum and thereby vary the transmissible torque, the band and drum being proportioned and arranged relative to each other and the direction of operation of the device whereby initial contact between the band and drum is at the highest pressure producing region of the band under all loads yet the band cannot become self-energizing and thereby take control of the maximum clutching pressure away from the energizing control connection.

WILLIAM CARLETON STARKEY.

REFERENCES CITED

The following references are of record in the file of this patent:

UNITED STATES PATENTS

| Number | Name | Date |
|---|---|---|
| 801,727 | Lindsay et al. | Oct. 10, 1905 |
| 852,045 | Vivinus | Apr. 30, 1907 |
| 998,615 | Huneke | July 25, 1911 |
| 1,561,537 | Hayes | Nov. 17, 1925 |
| 1,615,804 | Starkey | Jan. 25, 1927 |
| 1,629,098 | Drexler | May 17, 1927 |
| 1,704,062 | Starkey | Mar. 5, 1929 |
| 1,819,306 | Starkey et al. | Aug. 18, 1931 |
| 1,836,199 | Starkey | Dec. 15, 1931 |
| 1,870,646 | Pitter | Aug. 9, 1932 |
| 1,953,370 | Starkey | Apr. 3, 1934 |
| 2,024,947 | Racklyeft | Dec. 17, 1935 |
| 2,043,695 | Brownlee | June 9, 1936 |
| 2,055,239 | Mottlau | Sept. 22, 1936 |
| 2,229,654 | Hubbell | Jan. 28, 1941 |
| 2,235,266 | Starkey | Mar. 18, 1941 |
| 2,360,187 | Almen | Oct. 10, 1944 |
| 2,371,855 | Sunderland | Mar. 20, 1945 |